United States Patent
Lardellier

[19]

[11] Patent Number: 6,148,605
[45] Date of Patent: Nov. 21, 2000

[54] METHOD AND DEVICE FOR REVERSING THE THRUST OF VERY HIGH BYPASS RATIO TURBOJET ENGINES

[75] Inventor: Alain Lardellier, Melun, France

[73] Assignee: Societe Nationale d'Etude et de Construction de Moteurs d'Aviation "SNECMA", Paris, France

[21] Appl. No.: 09/262,345

[22] Filed: Mar. 4, 1999

[30] Foreign Application Priority Data

Mar. 5, 1998 [FR] France ................................. 98 02674

[51] Int. Cl.$^7$ ....................................... F02K 3/02
[52] U.S. Cl. .................... 60/204; 60/226.2; 415/123; 416/169 R
[58] Field of Search .................. 60/204, 226.1, 60/226.2, 262; 415/123, 18, 61; 416/169 R, 32

[56] References Cited

U.S. PATENT DOCUMENTS

| | | |
|---|---|---|
| 3,080,774 | 3/1963 | Nickerson et al. . |
| 3,116,817 | 1/1964 | Quick et al. . |
| 3,138,972 | 6/1964 | Murgue et al. . |
| 3,217,564 | 11/1965 | Smith . |
| 3,507,113 | 4/1970 | Herrmann et al. ...................... 60/39.16 |
| 4,005,575 | 2/1977 | Scott et al. ............................. 60/226.2 |
| 4,251,987 | 2/1981 | Adamson ............................... 60/39.75 |

FOREIGN PATENT DOCUMENTS

| | | |
|---|---|---|
| 845702 | 8/1939 | France . |
| 1489518 | 7/1967 | France . |
| 1 591 568 | 6/1981 | United Kingdom . |

*Primary Examiner*—Charles G. Freay
*Attorney, Agent, or Firm*—Oblon, Spivak, McClelland, Maier & Neustadt, P.C.

[57] ABSTRACT

A high bypass ratio turbojet engine comprising a fan rotated by the shaft of a low pressure turbine via a speed reducer is provided with a thrust reverser device by providing the speed reducer with first and second epicyclic gear trains which are mounted in parallel between the low pressure turbine and the fan and which are arranged in such a way as to drive the fan in a first direction of rotation when the engine is operated in a direct thrust mode, and to drive the fan in the opposite direction of rotation when the engine is to be operated in the reverse thrust mode.

8 Claims, 2 Drawing Sheets

METHOD AND DEVICE FOR REVERSING THE THRUST OF VERY HIGH BYPASS RATIO TURBOJET ENGINES

BACKGROUND OF THE INVENTION

1. Field of the Invention

The invention relates to a method and to a device for reversing the thrust of a turbojet engine having a very high bypass ratio.

Turbojet engines with high bypass ratios are well suited to subsonic flight and enable high propulsion efficiencies to be obtained for low specific fuel consumptions. Turbojet engines with very high bypass ratios of between 11 and 18 have an even better propulsion efficiency, but possess a greater mass and increased drag because of the large diameter of their fan. This type of jet engine can be made lighter by using an engine structure that has a speed reduction gear interposed between the low pressure turbine and the fan, but this structure is still heavier than a conventional engine with the same thrust. This is partly due the mass of the thrust reverser located in the large-diameter part of the nacelle.

2. Summary of the Prior Art

Conventional thrust reversers usually comprise displaceable elements, such as pivoting doors or gates, which cooperate in the deployed position to reverse the thrust.

It is also known to provide a turbomachine of the bypass type with a variable-pitch fan in which the blades can be pivoted in order to reverse the bypass flow. This arrangement is generally not as heavy as the conventional door-type or gate-type thrust reverser, but requires an expensive and complex mechanism for changing the pitch of the blades.

SUMMARY OF THE INVENTION

It is an object of the invention to solve the aforementioned problems and to provide a high bypass ratio turbojet engine with a thrust reversing device which is lighter than the known thrust reversers and has no complex pitch change mechanism.

To this end, the invention provides a thrust reverser device for a high bypass ratio turbojet engine having a fan, a low pressure turbine, and a speed reducer through which said fan is rotated by a shaft of said low pressure turbine, said thrust reverser device being realised by providing said speed reducer with first and second epicyclic gear trains mounted in parallel between said low pressure turbine and said fan in such a way that said fan is driven in a first direction of rotation in a first operating mode, called the direct mode, and said fan is driven in a second direction of rotation opposite to said first direction during a second operating mode, called the reverse mode, so as to reverse the thrust of the engine.

In the first operating mode, i.e. the direct thrust mode, the speed reducing gear assembly drives the fan in the same direction as the low pressure turbine shaft. In the second operating mode, i.e. the reverse thrust mode, the speed reducing gear assembly drives the fan in the opposite direction to the low pressure turbine shaft.

Thrust reversal is thus obtained by reversing the direction of rotation of the fan, and this is achieved by unlocking or releasing an outer ring gear which is common to both the first and the second epicyclic gear trains of the speed reducer.

Other preferred features and advantages of the invention will become apparent from the following description of the preferred embodiments, given by way of nonlimiting example, with reference to the appended drawings.

DESCRIPTION OF THE PREFERRED EMBODIMENTS

To reverse the thrust of a turbojet engine with a very high bypass ratio of between 11 and 18, the invention proposes reversing the direction of rotation of the fan by using a speed reduction gear assembly of the epicyclic type designed to drive the fan in one rotational direction or the other depending on whether the engine is required to operate in a direct thrust or reverse thrust mode.

The reduction ratio of the speed reduction gear assembly is preferably between 2.6 and 4.5.

Figure 1:
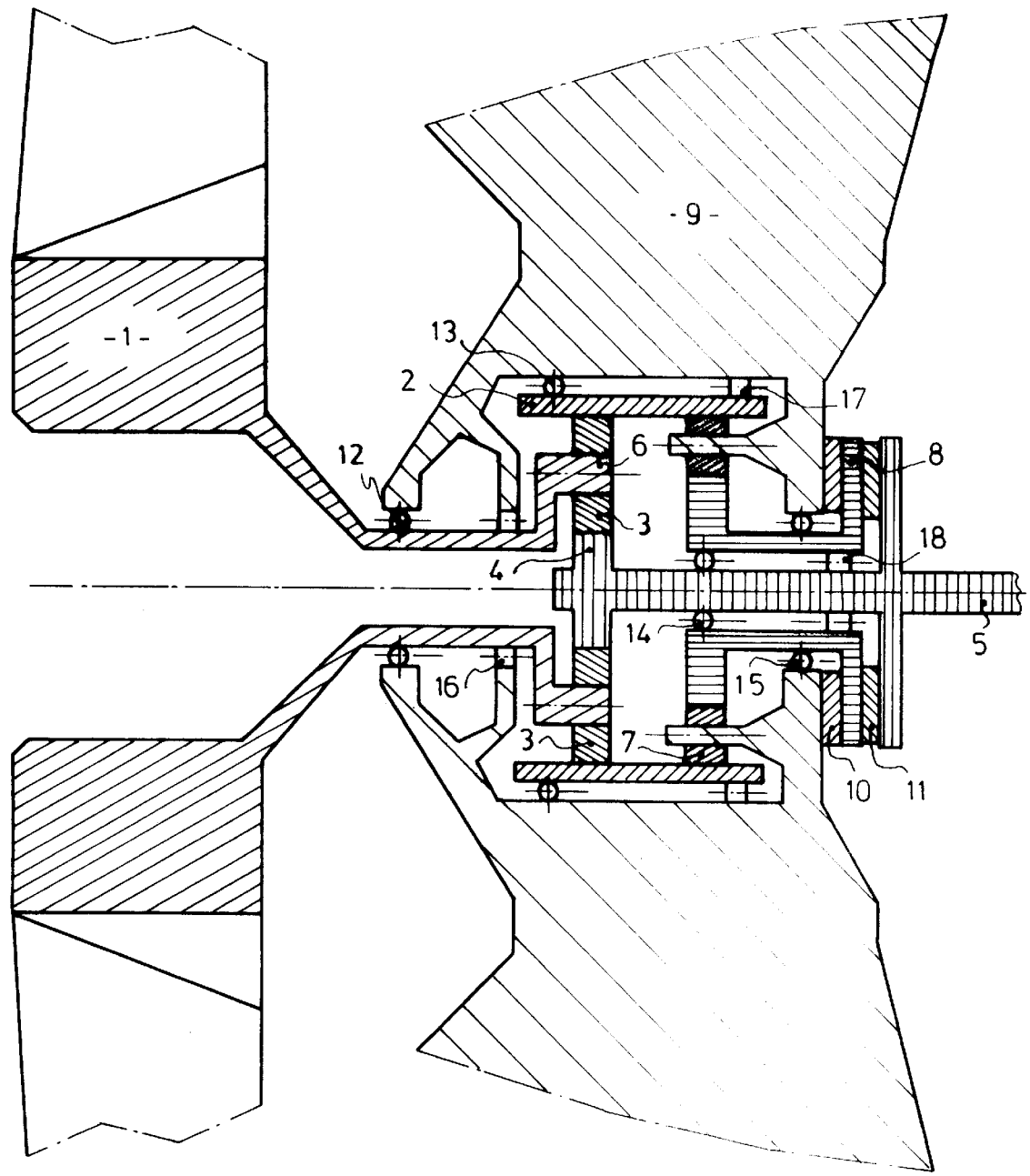
FIG. 1 is a longitudinal sectional view of part of a high bypass ratio turbojet engine provided with one embodiment of the thrust reversal device according to the invention.
Figure 2:
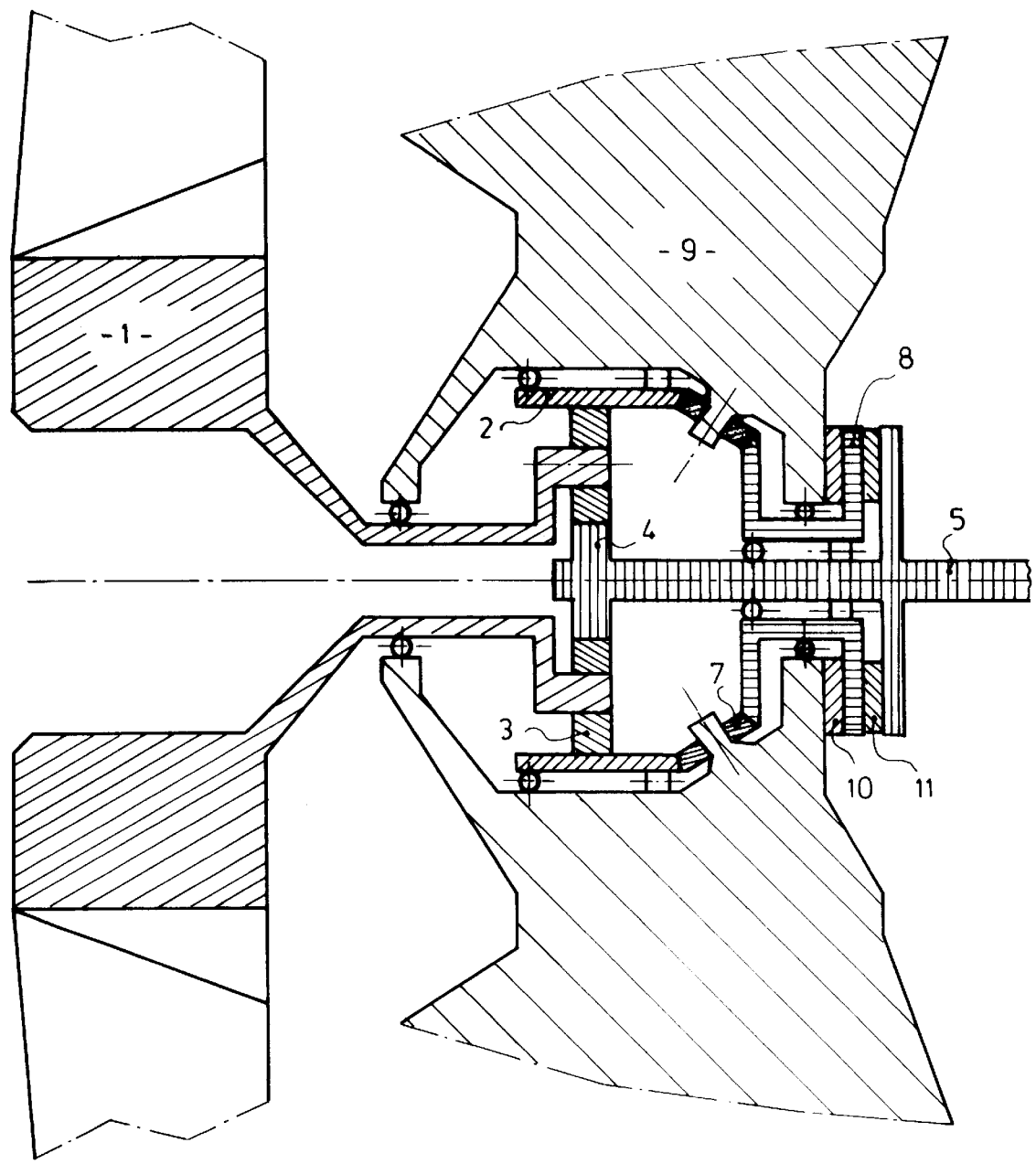
FIG. 2 is a view similar to that of FIG. 1, but showing an alternative embodiment of the thrust reversal device according to the invention.

FIGS. 1 and 2 show alternative embodiments of the thrust reversal device in accordance with the invention in which a speed reduction gear assembly of the epicyclic type is mounted between the fan 1 and the low pressure turbine (not shown) of the engine.

The reduction ratio of the speed reduction gear assembly depicted in FIGS. 1 and 2 has been chosen to be equal to 4 and is particularly well suited to a turbojet engine with a bypass ratio of the order of 15.

The speed reduction gear assembly comprises two epicyclic gear trains mounted in parallel, the two gear trains having a common outer ring gear 2. The first gear train comprises the outer ring gear 2, first planet gears 3 meshing, on the one hand, with the outer ring gear 2 and, on the other hand, with a first inner gear 4 connected to a shaft 5 of the low pressure turbine of the engine. The first planet gears 3 are mounted on a first planet gear carrier 6 secured to the fan 1.

The second gear train comprises the outer ring gear 2, and second planet gears 7 meshing with the outer ring gear 2 and with a second inner gear 8 which is coaxial with the shaft 5 of the low pressure turbine. The second planet gears 7 are mounted on the stationary frame 9 of the turbojet engine.

The thrust reverser device also comprises brake clutch means 10, 11 for securing the second inner gear 8 either to the stationary frame 9 or to the shaft 5 of the low pressure turbine depending on whether the jet engine is to be operated in a direct thrust mode or in a reverse thrust mode. The brake clutches 10, 1 1 are associated with brakes (not shown) which are preferably of the carbon disk brake type.

Bearings 12, 13, 14, 15, 16, 17, 18 are provided between the stationary and rotating parts of the thrust reversal device for withstanding the axial and/or radial loadings.

In the embodiment of FIG. 1, all the gears are spur gears. In the alternative embodiment depicted in FIG. 2, the planet gears 7 and the second inner gear 8 are bevel gears. However, the way in which the thrust reversal device operates is the same in both of the embodiments.

In the direct thrust operating mode, the brake clutch means 10 are actuated to secure the second inner gear 8 to the stationary frame 9. This immobilizes the outer ring gear 2, and the fan 1 is driven by the shaft 5 of the low pressure turbine via the first gear train to rotate in the same direction as the shaft 5 rotates but at a speed which is four times lower if the reduction ratio is 4.

An expression for the reduction ratio is obtained by applying Willis' formula. If r1 is the radius of the first inner gear 4 and R1 is the radius of the outer ring gear 2 at the first gear train, then the reduction ratio can be expressed as 1/Z1, where $$Z1 = \frac{1}{1 + (R1/r1)}$$

The reduction ratio is thus 4 if R1=3r1.

In the reverse thrust operating mode, the brake clutch means 10 are deactivated to unlock or release the second inner gear 8 from the frame 9 and the brake clutch means 11 are actuated to connect it to the shaft 5 of the low pressure turbine of the engine. The outer ring gear 2 is then driven to rotate by the second gear train in the opposite direction to the low pressure turbine shaft 5.

The reduction ratio 1/Z2 of the reduction gear assembly is obtained from Willis' formula. If r2 is the radius of the second inner gear 8 and R2 is the radius of the outer ring gear 2 at the second gear train, the radius R2 being assumed equal to R1 in our example, then Z2 is of the form:

$$Z2 = \left(\frac{r1 - r2}{R1}\right) / \left(1 + \frac{r1}{R1}\right)$$

For the fan 1 to rotate in the opposite direction to the direction of rotation of the low pressure turbine shaft 5, and for the absolute values of the reduction ratio in the reverse and direct thrust modes to be equal, then it is necessary to have Z2=−Z1. This condition requires that: r2=2r1, which is the case in the embodiments depicted in FIGS. 1 and 2.

In the transition phase of passing from the direct operating mode to the reverse operating mode, it is necessary to place the engine in an idling condition, deactivate the brake clutch means 10 progressively, and then activate the brake clutch means 11 progressively. During this phase, control of the jet engine keeps the rotational speed of the low pressure turbine shaft 5 constant until the rotational speed of the second inner gear 8 is equal to the rotational speed of the low pressure turbine shaft 5. The brake clutch means 11 are then locked and the engine operating speed is accelerated in the reverse operating mode.

In the transition phase passing from the reverse operating mode to the direct operating mode, the operations are similar and performed with the same precautions as described above. The engine is placed in an idling condition, the brake clutch means 11 are deactivated progressively and the brake clutch means 10 are activated progressively, both while keeping the rotational speed of the low pressure turbine shaft 5 constant. The brake clutch means 10 are then locked and the engine is accelerated in the direct operating mode.

It will of course be appreciated that the invention is not restricted to the embodiments as specifically described above. For example, the radii of the inner gears and the outer ring gear of the gear trains may be adapted to suit the desired reduction ratio. Also, other types of epicyclic gear trains arranged in series may be used.

I claim:

1. A thrust reverser device for a high bypass ratio turbojet engine having a fan, a low pressure turbine, and a speed reducer through which said fan is rotated by a shaft of said low pressure turbine, said thrust reverser device being realised by providing said speed reducer with first and second epicyclic gear trains mounted in parallel between said low pressure turbine and said fan in such a way that said fan is driven in a first direction of rotation in a first operating mode, called the direct mode, and said fan is driven in a second direction of rotation opposite to said first direction during a second operating mode, called the reverse mode, so as to reverse the thrust of the engine.

2. The thrust reverser device as claimed in claim 1, wherein said first epicyclic gear train comprises a first inner gear secured to said shaft of said low pressure turbine, first planet gears mounted on a planet gear carrier secured to said fan, and an outer ring gear, and wherein control means is provided for immobilizing said outer ring gear in the direct operating mode and for permitting said outer ring gear to be rotated by said second epicyclic gear train in the reverse operating mode.

3. The thrust reverser device as claimed in claim 2, wherein said second epicyclic gear train comprises a second inner gear coaxial with said shaft of said low pressure turbine, and second planet gears mounted on a stationary frame of the engine and meshing with said outer ring gear.

4. The thrust reverser device as claimed in claim 3, wherein said control means comprises first clutch means for securing said second inner gear to said stationary frame in said direct operating mode, and second clutch means for coupling said second inner gear to said shaft of said low pressure turbine in said reverse operating mode.

5. A method of reversing the thrust of a high bypass ratio turbojet engine having a fan rotated by the shaft of a low pressure turbine through a speed reducer comprising first and second epicyclic gear trains mounted in parallel between said low pressure turbine and said fan and constituting a thrust reverser device as claimed in claim 4, said method comprising the step of releasing the outer ring gear which is common to said first and second epicyclic gear trains such that the direction of rotation of the fan is reversed in order to reverse the thrust of the engine.

6. The method as claimed in claim 5, wherein said step of releasing said outer ring gear comprises:

progressively deactivating said first clutch means to release said second inner gear from the stationary frame of the engine; and progressively activating said second clutch means to couple said second inner gear to said shaft of said low pressure turbine.

7. The method as claimed in claim 6, wherein the direction of rotation of the fan is changed while placing said engine in an idling condition and keeping the rotational speed of said low pressure turbine shaft constant.

8. The method as claimed in claim 7, wherein the rotational speed of said low pressure turbine shaft is kept constant until the rotational speed of said second inner gear is equal to the rotational speed of said low pressure turbine, and is then accelerated in the reverse operating mode.

* * * * *